Patented Oct. 22, 1940

2,218,568

UNITED STATES PATENT OFFICE 2,218,568

ETHERS OF PENTAHYDRIC ALCOHOLS

Elwood V. White, Moscow, Idaho, assignor to The Dow Chemical Company, Midland, Mich., a corporation of Michigan No Drawing. Application September 13, 1939, Serial No. 294,684

8 Claims. (Cl. 260—615)

This invention relates to new partially substituted ethers of polyhydroxy compounds.

The customary method of preparing partial ethers of polyhydric alcohols consists in direct etherification of the polyhydroxy compound with an etherifying agent limited in quantity to give approximately the required degree of etherification. The treatment of compounds containing both primary and secondary alcoholic groups by this method may result in the preferential substitution of the former. Thus, for example, the ethylation of xylitol to form a di-substituted ether results in a mixed product which contains considerable 1,5-diethyl xylitol.

For some purposes, especially for use in the manufacture of alkyd resins, it is desirable to utilize partial ethers of polyhydroxy compounds in which the primary alcoholic groups are not substituted. One reason for this is that these groups are said to be more reactive than secondary alcoholic groups and lead to a smoother, easier reaction with polybasic acids. Further, polyhydric alcohols containing two primary alcoholic groups are believed to be more valuable alkyd resin raw materials than those containing only one.

It is, accordingly, an object of this invention to prepare partial ethers of polyhydroxy compounds containing both primary and secondary alcoholic groups in which the former are unsubstituted. A further object is the preparation of partial ethers of pentitols in which the two primary alcoholic groups are unsubstituted. Other objects will become apparent in the following detailed description.

The objects are attained by subjecting to hydrolysis the alkyl ethers of pentosides, prepared in the manner described in my co-pending application, Serial No. 294,683, filed concurrently herewith, and then reducing the pentose ether product. The whole series of steps of preparing the new products, including the steps shown in the said co-pending application, may thus be represented by the scheme:

Pentosan $\xrightarrow{\text{caustic soda solution}}$ alkali pentosan $\xrightarrow{\text{etherifying agent}}$ pentosan ether

Alcoholysis $\longrightarrow$ pentoside ether $\xrightarrow{\text{hydrolysis}}$ pentose ether reduction $\longrightarrow$ pentitol ether The said co-pending application is concerned primarily with the steps leading up to and including the acid alcoholysis of pentosan ethers to form ethers of pentosides. The present application is concerned with the product of the further steps of hydrolysis to form pentose ethers and subsequent reduction to form the herein-claimed pentitol ethers.

For the purpose of the present application, the term "pentitol" is used to designate a normal pentahydric alcohol derived by reduction of a pentose, just as the term "mannitol," for example, is commonly used to name the alcohol derivable from mannose by reduction.

The etherifying agent used in the above scheme may be any alkylating agent, for example, methyl chloride or sulphate, ethyl chloride or sulphate, lauryl chloride or the corresponding bromides. Also, any primary or secondary liquid alcohol may be used in the alcoholysis step, although it is preferred to use a cheap primary alcohol such as ethanol for this purpose. The alcoholysis is conveniently carried out by heating the previously prepared pentosan ether with 3 to 6 times its weight of ethyl alcohol containing 2 per cent of hydrochloric acid gas.

Hydrolysis of the pentoside ether to obtain the corresponding pentose ether is conveniently carried out by heating with a dilute solution of mineral acid in the usual way. Also, there are many known ways of effecting reduction of the hydrolytic product. Use of a process of hydrogenation is convenient and is described in the following examples.

The process outlined above leads to the preparation of compounds which may be represented by the general formula:

$$CH_2OH-CHOR-CHOR-CHOH-CH_2OH$$

wherein R is an alkyl group or hydrogen, there being at least one alkyl group present. Examples of such compounds are: 2,3-diethyl xylitol, monoporpyl xylitol, monoethyl xylitol, monobutyl xylitol, monolauryl xylitol, and the corresponding arabinitol mono- and di-ethers.

Also, within the scope of this invention, are tri-substituted ethers of pentitols, prepared by the further etherification of pentoside ethers obtained as above, followed by hydrolysis and reduction. Such further etherification leads to the production of compounds of the formula:

$$CH_2OH-CHOR-CHOR-CHOR-CH_2OH$$

wherein R is an alkyl group. The scheme whereby the tri-substituted pentitol ethers may be obtained includes the steps:

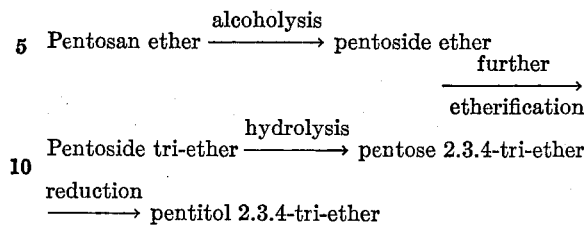

Ethers of the latter type, being only bi-functional, give flexible, non-heat hardening resins with di-basic acids, while those containing at least one secondary-hydroxy group besides two alpha-hydroxy or primary alcohol groups give heat hardenable, less flexible resins. By making appropriate mixes of the two classes of pentitol ethers of this invention, therefore, it is possible to prepare alkyd resins with a wide range of properties. Besides this utility as raw materials for alkyd resin manufacture, the compounds of the invention have application in many of the other uses where glycerol, glycol and similar compounds are at present employed, for example, as humectants of moderate hygroscopicity.

The following examples illustrate the practice of the invention:

EXAMPLE 1

*Diethyl xylitol*

83 grams of ethyl diethyl xyloside containing 53 per cent ethoxy boiling at 130° to 140° C. at 1.5 millimeters, and prepared according to the method described in the co-pending application, Serial No. 294,683, by acid alcoholysis of diethyl pentosan, is placed in a 300 cc. glass reaction tube and 250 cc. of 0.1 normal sulphuric acid is added. The vessel is sealed and heated for 3½ hours at 125° C.

The calculated quantity of a 5 per cent solution of barium hydroxide to neutralize the free acid is added to the cooled reaction product followed by 10 grams of barium carbonate, and the mixture is filtered. A constant copper reducing value of the neutral filtrate shows that complete hydrolysis to ethyl xylose has taken place.

The aqueous solution of ethyl xylose is hydrogenated at 135° C. for 2½ hours under 1000 pounds hydrogen pressure with the use of Raney nickel catalyst. The hydrogenated product is filtered free from nickel and evaporated in vacuo to a clear, colorless syrup. The latter distills at 140°–160° C. under 1.5 mm. pressure. A water-white syrup, weighing 51 grams is obtained which crystallizes on standing. On recrystallization from a 50:50 acetone-petroleum ether mixture, pure diethyl xylitol melting at 67°–68° C. is obtained.

In like manner other alkyl xylosides which yield water-soluble alkyl xyloses on hydrolysis are put through the series of steps outlined in the above example to yield the corresponding mono- and di-alkyl xylitols. Thus, a monomethyl hemicellulose yields monomethyl xylitol.

EXAMPLE 2

*Preparation of 2,3,4-triethyl xylitol*

A mixture of 22.5 grams of ethyl mixed ethyl pentosides and 36 grams of powdered sodium hydroxide, was further etherified with 60 cc. of ethyl chloride in a medium of 135 cc. of benzene. The reaction was continued for 6 hours at 140° C. after which the mixture was neutralized with hydrochloric acid and diluted with 1.5 liters of water. Volatile organic solvents were steamed off. The remaining solution was made about 0.8 N with hydrochloric acid and heated on a steam bath for 2 days. The mixture was neutralized with sodium carbonate, decolorized with carbon, filtered, and the clear filtrate hydrogenated in the presence of 0.34 gram of Raney nickel, at 140° C. under a hydrogen pressure of 1000 pounds for 8 hours. The hydrogenated mixture was evaporated down to remove water, and the solid mass extracted with a 4:1 toluene-ethanol mixture. Crystals of 2,3,4-triethyl xylitol were obtained, having an ethoxy value of 57 per cent.

I claim:

1. An ether of a pentitol containing 2 free primary alcohol groups.
2. A partial ether of a pentitol containing 2 free primary alcohol groups and at least one free secondary alcohol group.
3. A tri-substituted ether of a pentitol containing 2 free primary alcohol groups.
4. An alkyl partial ether of a pentitol containing 2 free primary alcohol groups and at least 1 free secondary alcohol group.
5. A tri-substituted alkyl ether of a pentitol containing 2 free primary alcohol groups.
6. An ethyl partial ether of a pentitol containing 2 free primary alcohol groups and at least 1 free secondary alcohol group.
7. 2,3-diethyl xylitol.
8. 2,3,4-triethyl xylitol.

ELWOOD V. WHITE.